(12) United States Patent
Kuno

(10) Patent No.: US 9,656,539 B2
(45) Date of Patent: May 23, 2017

(54) BELT MOLDING FOR VEHICLE

(71) Applicant: TOKAI KOGYO CO., LTD., Obu-shi, Aichi (JP)

(72) Inventor: Haruhito Kuno, Obu (JP)

(73) Assignee: TOKAI KOGYO CO., LTD., Obu-shi (JP)

( * ) Notice: Subject to any disclaimer, the term of this patent is extended or adjusted under 35 U.S.C. 154(b) by 0 days.

(21) Appl. No.: 14/431,269

(22) PCT Filed: Oct. 3, 2013

(86) PCT No.: PCT/JP2013/076997
§ 371 (c)(1),
(2) Date: Mar. 25, 2015

(87) PCT Pub. No.: WO2014/054757
PCT Pub. Date: Apr. 10, 2014

(65) Prior Publication Data
US 2015/0266366 A1    Sep. 24, 2015

(30) Foreign Application Priority Data
Oct. 4, 2012 (JP) ................................. 2012-234180

(51) Int. Cl.
*B60J 10/04* (2006.01)
*B60J 10/00* (2016.01)
(Continued)

(52) U.S. Cl.
CPC ............... *B60J 10/75* (2016.02); *B60J 10/32* (2016.02)

(58) Field of Classification Search
CPC .. B60J 10/041; B60J 10/0002; B60J 10/0008; B60J 10/0071
(Continued)

(56) References Cited

U.S. PATENT DOCUMENTS 3,836,421 A * 9/1974 Terry, Jr. .................. D03D 7/00
428/88
3,944,693 A * 3/1976 Ungerer ................. A47H 99/00
427/201
(Continued)

FOREIGN PATENT DOCUMENTS

CN         101439657 A      5/2009
JP         S50-91914        8/1975
(Continued)

OTHER PUBLICATIONS

Nov. 12, 2013 International Search Report issued in International Patent Application No. PCT/JP2013/076997.
(Continued)

*Primary Examiner* — Justin Rephann
(74) *Attorney, Agent, or Firm* — Oliff PLC

(57) ABSTRACT

This belt molding abuts against a window pane which is attached to a window opening of a vehicle door so as to be able to move up and down. The belt molding includes at least two or more sealing portions, and abutment portions are formed on the respective sealing portions. Fiber layers) made of numerous fibers are formed on the abutment portions, and types of the fibers forming the fiber layers are different from each other. Accordingly, abutment portions suitable for the respective sealing portions can be obtained depending on positions where the sealing portions are formed.

13 Claims, 2 Drawing Sheets

(51) Int. Cl.
*B60J 10/75* (2016.01)
*B60J 10/32* (2016.01)

(58) Field of Classification Search
USPC .......... 49/475.1, 480.1, 483.1, 484.1, 489.1, 49/490.1, 495.1, 498.1
See application file for complete search history.

(56) References Cited

U.S. PATENT DOCUMENTS

| | | | | |
|---|---|---|---|---|
| 4,148,953 A | * | 4/1979 | Horton | D04H 11/00 428/85 |
| 4,164,599 A | * | 8/1979 | Kessler | D05C 17/00 156/272.2 |
| 4,424,647 A | * | 1/1984 | Sasaki | B60J 10/0008 49/377 |
| 4,754,589 A | * | 7/1988 | Leth | B28B 5/04 49/475.1 |
| 5,005,317 A | * | 4/1991 | Saint-Louis Augustin | B60J 10/041 49/377 |
| 5,170,586 A | * | 12/1992 | Ose | B60J 10/041 49/377 |
| 5,247,764 A | * | 9/1993 | Jeshurun | B60J 10/0008 428/120 |
| 5,354,594 A | * | 10/1994 | Naito | B60J 10/0008 428/122 |
| 5,948,499 A | * | 9/1999 | Tsukada | B60J 10/041 428/90 |
| 6,446,392 B1 | * | 9/2002 | Maki | B60J 10/0051 49/377 |
| 7,066,473 B2 | * | 6/2006 | Arata | B60J 10/0008 277/652 |
| 2005/0029752 A1 | * | 2/2005 | Arata | B60J 10/0008 277/644 |
| 2006/0053614 A1 | * | 3/2006 | Tamura | B23P 19/047 29/452 |
| 2007/0101657 A1 | * | 5/2007 | Okajima | B29C 47/003 49/490.1 |
| 2009/0133335 A1 | * | 5/2009 | Tamura | B60J 10/0011 49/489.1 |
| 2010/0242373 A1 | * | 9/2010 | Iacovoni | B60J 10/041 49/495.1 |

FOREIGN PATENT DOCUMENTS

| | | |
|---|---|---|
| JP | 5-44637 U | 6/1993 |
| JP | H10-331028 A | 12/1998 |
| JP | 2002-219944 A | 8/2002 |

OTHER PUBLICATIONS

Mar. 23, 2016 Office Action issued in Chinese Application No. 201380050340.9.

* cited by examiner

BELT MOLDING FOR VEHICLE

TECHNICAL FIELD

The present invention is an invention relating to a belt molding that is attached to a vehicle door and wipes off surfaces of a window pane.

BACKGROUND ART

There is a window opening in a vehicle door, and a window pane is attached so as to open and close the window opening. Also, a belt molding is attached to a lower side of a peripheral edge of the window opening, and the belt molding has sealing portions that come into contact with a surface of the window pane and wipe off water, grit, dust, or the like.

For example, as described in the following Patent Document 1, numerous fibers (also referred to as a flock or a pile) for reducing sliding resistance with the window pane are erected from the surfaces of the sealing portions.

CITATION LIST

Patent Literature

[Patent Document 1] JP-U-H05-44637

SUMMARY OF INVENTION

Technical Problem

However, in the belt molding obtained by the technique of the above Patent Document 1, the same fibers are flocked in an upper seal lip and a lower seal lip of the belt molding. For this reason, it is not possible to cope with a case where different levels of performance are required in the upper seal lip and the lower seal lip.

For example, although longer fibers of the upper seal lip easily prevent entering of foreign matter, such as sand, if fibers of such a length that entering of the foreign matter is easily prevented are also flocked in the lower seal lip, the distance from the window pane becomes long and also the gap between the fibers increases. Therefore, there is a fear that the effect of noise insulation may deteriorate.

Accordingly, a problem to be solved by the invention is to provide a belt molding that has abutment portions having fibers, which are suitable for the respective sealing portions, being erected therefrom.

Solution to Problem (1) In order to solve the above-described problem, the present invention provides a belt molding attached to a vehicle door and abutting against a window pane which is arranged in a window opening of a door body and can be moved up and down, the belt molding including: an elongated body portion attached along a flange of the window opening; and two or more sealing portions protruding from portions of the body portion facing the window pane and respectively having abutment portions which are formed along a longitudinal direction of the body portion and abut against the window pane, wherein numerous fibers are erected from a surface of the abutment portion of each of the sealing portions, and wherein the fibers of one abutment portion are different from the fibers of another abutment portion.

In this configuration, since the fibers erected from the respective sealing portions are different from each other, the respective sealing portions show different behaviors when the sealing portions abut against the window pane. For this reason, abutment portions suitable for the respective sealing portions can be obtained depending on positions where the respective sealing portions are formed.

(2) In the belt molding according to the above-described (1), a sheet material having a fiber layer, in which the numerous fibers are erected from a surface of a sheet-like base material, may be adhered to at least one of the abutment portions. According to this configuration, an abutment portion having a high-density fiber layer that is relatively small in dispersion can be obtained.

(3) In the belt molding according to the above-described (2), the sheet materials having fiber layers in which different fibers are erected may be respectively adhered to two or more of the abutment portions. According to this configuration, two or more abutment portions having high-density fiber layers that are relatively small in dispersion can be obtained.

(4) In the belt molding according to any one of the above-described (1) to (3), the fibers of the one abutment portion may be shorter than the fibers of the other abutment portion. According to this configuration, the distance between the sealing portion from which short fibers are erected and the window pane becomes short. As a result, excellent sound insulating properties can be given to the sealing portion. Additionally, even when a vehicle is used at a low temperature, such as in winter, waterdrops do not easily accumulate between the window pane and the sealing portion. As a result, sticking of the sealing portion onto the window pane caused by freezing of the waterdrops can be prevented.

(5) In the belt molding according to any one of the above-described (1) to (3), the fibers of the one abutment portion may be longer than the fibers of the other abutment portion. According to this configuration, in the sealing portion from which long fibers are erected, the fiber layer of the abutment portion plays the role of a cushion even against relatively large foreign matter, such as sand, and the force of pressing the foreign matter against a surface of the window pane is relaxed. Therefore, damage (biting) to the window pane caused by the foreign matter can be prevented.

(6) In the belt molding according to the above-described (4) or (5), the fibers of the abutment portion of the sealing portion arranged on an upper side may be longer than the fibers of the abutment portion of the sealing portion arranged on a lower side. According to this configuration, damage to the window pane caused by foreign matter can be prevented by the upper sealing portion of which the fibers are long, and excellent sound insulating properties can be secured by the lower sealing portion of which the fibers are short.

(7) In the belt molding according to any one of the above-described (1) to (6), the fiber length of at least one of the abutment portions may be 0.3 mm or greater and 1.0 mm or smaller. According to this configuration, fiber layers suitable for the abutment portions of the belt molding can be formed.

(8) In the belt molding according to any one of the above-described (1) to (7), the fibers of the one abutment portion may be thinner than the fibers of the other abutment portion. According to this configuration, the fibers are easily bent and the distance between the abutment portions and the window pane becomes short. Therefore, excellent sound insulating properties can be given to the sealing portions.

(9) In the belt molding according to any one of the above-described (1) to (7), the fibers of the one abutment portion may be thicker than the fibers of the other abutment portion. According to this configuration, the state of abutment with the window pane is not easily influenced by the presence/absence of waterdrops. Therefore, even if the window pane is moved up and down in a state where water has adhered to the abutment portions, abnormal noise is not easily generated.

(10) In the belt molding according to the above-described (8) or (9), the fibers of the abutment portion of the sealing portion arranged on a lower side may be thinner than the fibers of the abutment portion of the sealing portion arranged on an upper side. According to this configuration, excellent sound insulating properties can be given to the lower sealing portion.

(11) In the belt molding according to any one of the above-described (1) to (10), the fiber thickness of at least one of the abutment portions may be 1.0 decitex or greater and 4.5 decitex or smaller. According to this configuration, fiber layers suitable for the abutment portions of the belt molding can be formed.

(12) In the belt molding according to any one of the above-described (1) to (11), the fibers of at least one of the abutment portions may be made of nylon-based resin. According to this configuration, the abutment portion can be cheaply formed compared to other types of fibers.

(13) In the belt molding according to any one of the above-described (1) to (12), the fibers of at least one of the abutment portions may be made of polyester-based resin. According to this configuration, even in a state where water has adhered to the abutment portion, generation of abnormal noise when the window pane is moved up and down can be suppressed.

(14) In the belt molding according to the above-described (12) or (13), the fibers of the abutment portion of the sealing portion arranged on an upper side may be made of polyester-based resin, and the fibers of the abutment portion of the sealing portion arranged on a lower side may be made of nylon-based resin. According to this configuration, abnormal noise when the window pane is moved up and down can be suppressed at the upper sealing portion to which water adheres easily, and an inexpensive belt molding can be obtained.

(15) In the belt molding according to any one of the above-described (1) to (14), the belt molding may be an inner belt molding attached to a vehicle interior side.

(16) In the belt molding according to any one of the above-described (1) to (14), the belt molding may be an outer belt molding attached to a vehicle exterior side.

Advantageous Effects of Invention

According to the invention, a belt molding having abutment portions suitable for the respective sealing portions can be provided.

DESCRIPTION OF EMBODIMENTS

Hereinafter, an embodiment, in which a mode for carrying out the invention is applied to a belt molding (also referred to as a belt molding, a weather strip, a water wiping seal, or the like) mounted along a window opening of a vehicle and is specified, will be described.

First, a schematic configuration of a belt molding attached to a vehicle door 1 will be described with reference to FIGS. 1 and 2.

Figure 1:
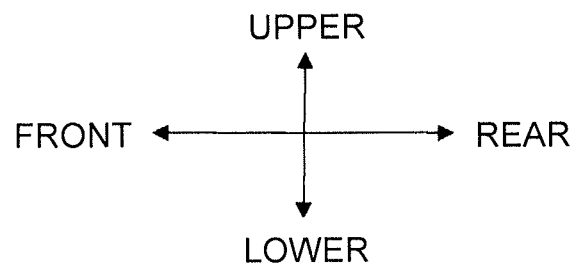
FIG. 1 is a side view of a vehicle door illustrating an attachment position of a belt molding in an embodiment of the invention.
Figure 1:
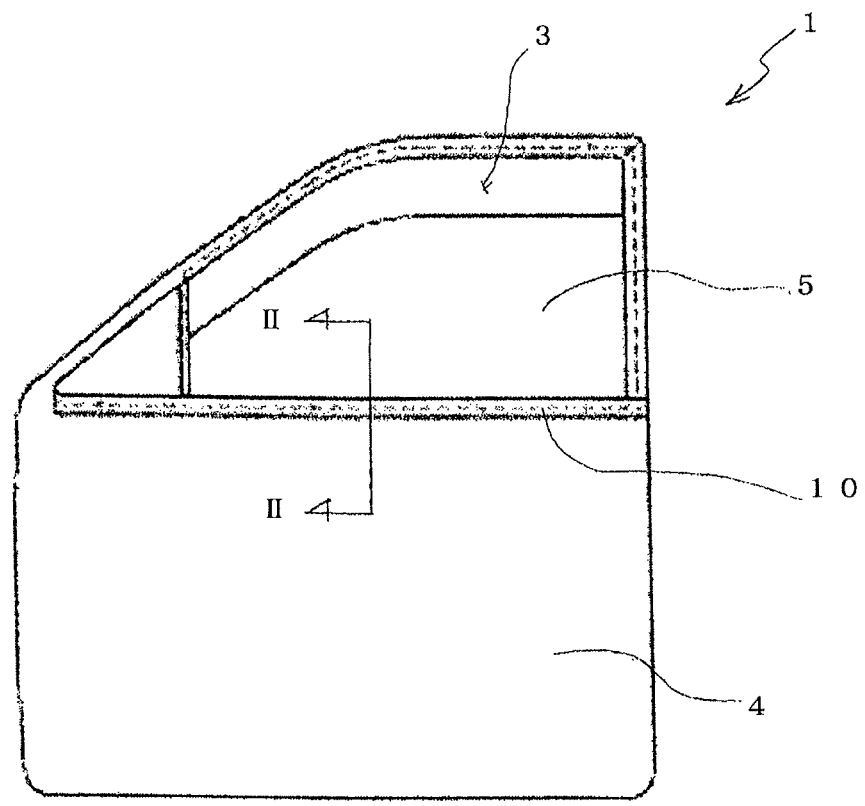

As illustrated in FIG. 1, an outer belt molding 10 that is an example of the belt molding is attached along a front-rear direction of a vehicle on a lower side of a peripheral edge of a window opening 3 of the vehicle door 1.

Figure 2:
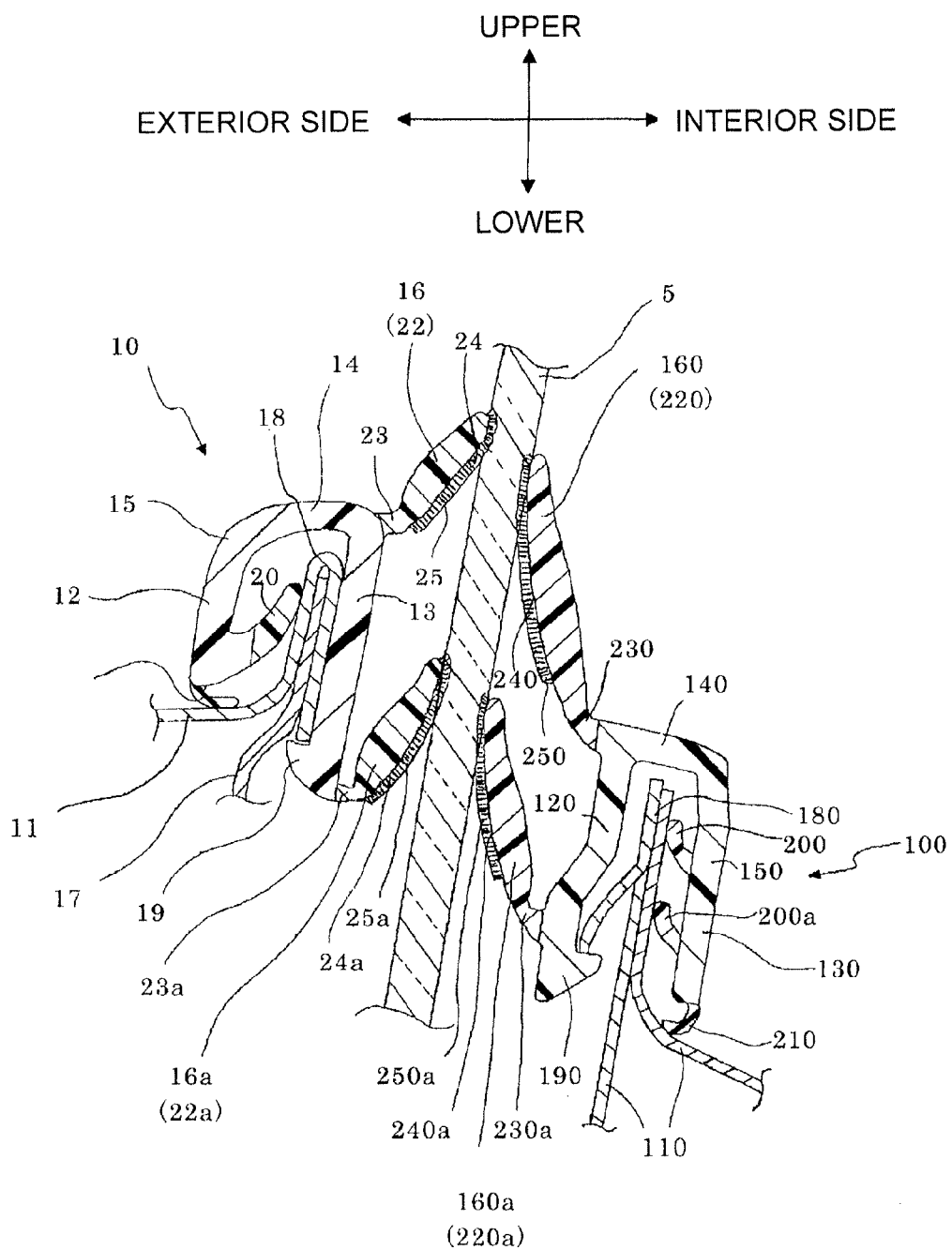
FIG. 2 is a cross-sectional view taken along II-II of FIG. 1.

Further, as illustrated in FIG. 2, as the belt molding, there are the outer belt molding 10 (an example of the belt molding) arranged on an exterior side of a window pane, and an inner belt molding 100 (an example of the belt molding) arranged on an interior side of the window pane 5. In addition, the inner belt molding 100 that is an example of the belt molding is attached along the front-rear direction of the vehicle on the lower side of the peripheral edge of the opening 3 on the interior side of the window pane 5. A door panel 4 has an outer door panel 11 and an inner door panel 110. The outer belt molding 10 is attached to the outer door panel 11, and the inner belt molding 100 is attached to the inner door panel 110. The window pane 5 is arranged between the outer belt molding 10 and the inner belt molding 100, and the window pane 5 is moved up and down in an upper-lower direction by an actuator, such as a motor (not illustrated).

The outer belt molding 10 abuts against the surface of the window pane 5 of the exterior side so as to perform sealing, and the inner belt molding 100 abuts against the surface of the window pane 5 on the interior side so as to perform sealing. The outer belt molding 10 and the inner belt molding 100 have a role in wiping off waterdrops or foreign matter (sand, grit, dust, or the like) adhering to the surfaces of the window pane when the window pane moves up and down, so as to keep an occupant's lateral view excellent.

In addition, in the present embodiment, when each belt molding is attached to the vehicle door 1, a side directed to the vehicle exterior side is referred to as an exterior side, and a side directed to the vehicle interior side is referred to as an interior side. Additionally, when each belt molding is attached to the vehicle door 1, a side that becomes the upper side in the gravitational direction is referred to as an upper side, and a side that becomes the lower side in the gravitational direction is referred to as a lower side. Additionally, a longitudinal direction refers to the longitudinal direction of each belt molding, and a width direction refers to a direction orthogonal to the longitudinal direction.

FIG. 1 is a view when the vehicle door is seen from the exterior side, and the outer belt molding 10 is illustrated as the belt molding. Hereinafter, the outer belt molding 10 will be described in detail.

As illustrated in FIG. 2, the outer belt molding 10 has an elongated body portion 15 having a substantially U-shaped cross section, and a plurality of (two in the present embodiment) sealing portions 16 and 16a. The body portion 15 has an exterior lateral wall portion 12 and an interior lateral wall portion 13 that are arranged in parallel in an interior and exterior direction at a predetermined distance from each other, and a connecting portion 14 that connects upper portions of the exterior and interior lateral wall portions. A surface of the interior lateral wall portion 13 of the body portion 15, which faces the window pane 5 in a state where the belt molding is attached to the vehicle door 1, is provided with the plurality of (two in the present embodiment) sealing portions 16 and 16a that protrude toward the window pane 5 from the surface.

In the present embodiment, a tip of the outer door panel 11 forms a flange portion 18 by being subjected to hemming processing in a state where the tip is folded so as to wrap a tip of a reinforcement 17. The outer belt molding 10 is attached to the flange portion 18 by inserting the flange portion 18 into the body portion 15. Further, the outer belt molding 10 is retained on the flange portion 18 by an engaging portion 19 that is formed at a lower end of the interior lateral wall portion 13 and is engaged with the folded tip of the flange portion 18, a retaining lip 20 that protrudes from the exterior lateral wall portion 12 and abuts against the flange portion 18, and a cover lip 21 that protrudes from a lower end of the exterior lateral wall portion 12 and abuts against the outer door panel 11.

Further, in the present embodiment, the two sealing portions 16 and 16a respectively protrude from an upper end and the lower end of the interior lateral wall portion 13 toward the window pane 5. Seal body portions 22 and 22a form a lip shape. Additionally, seal root portions 23 and 23a have portions that are formed so as to be thinner than the seal body portions 22 and 22a, and are deformed at the thinned portions according to the up and down of the window pane 5. Moreover, surfaces of the seal body portions 22 and 22a that face the window pane 5 are formed with abutment portions 24 and 24a that abut against the window pane 5, and the abutment portions 24 and 24a have fiber layers 25 and 25a for reducing the sliding resistance between the window pane 5 and the sealing portions 16 and 16a, on the surfaces thereof on the window pane. The fiber layers 25 and 25a are formed by numerous fibers (piles) being erected so as to protrude substantially perpendicularly from the respective surfaces of the abutment portions 24 and 24a.

Further, the inner belt molding 100 also has a structure similar to the outer belt molding 10. That is, the inner belt molding 100 has a body portion 150 having a exterior lateral wall portion 120, a interior lateral wall portion 130, and a connecting portion 140, and a plurality of (two in the present embodiment) sealing portions 160 and 160a that protrude from the exterior lateral wall portion 120 toward the window pane. When the body portion 150 is attached to a flange portion 180 of the inner door panel 110, a locking portion 190 is engaged with a lanced portion of the flange portion 180, and retaining lips 200 and 200a and a cover lip 210 comes into contact with the surface of the inner door panel 110. Also, the sealing portions 160 and 160a of the inner belt molding 100 are also formed with seal root portions 230 and 230a having portions that can be more easily deformed than the seal body portions 220 and 220a, and abutment portions 240 and 240a that abut against the window pane 5. The abutment portions 240 and 240a are respectively formed with fiber layers 250 and 250a configured by numerous fibers.

In addition, an interior material, such as a door trim (not illustrated), is arranged on the interior side of the inner belt molding 100 in the present embodiment.

Further, the body portions 15 and 150 of the respective belt moldings are respectively made of materials that are moldable by extrusion molding, injection molding, or the like. For example, thermoplastic elastomers, resin, rubber, or the like can be used, and specifically, an olefin-based thermoplastic elastomer (TPO), a styrene-based elastomer (TPS), polyvinyl chloride resin (PVC), polypropylene resin (PP), an ethylene propylene diene copolymer (EPDM), and the like are included as the materials.

As the materials that form the respective body portions 15 and 150, materials of which the durometer hardness (Type D) according to JISK7215 is HDD 50 to 80 are preferably used. In the present embodiment, the body portions are formed of a TPO material of HDD 65.

The sealing portions 16, 16a, 160, and 160a of the respective belt moldings are made of materials that are moldable by extrusion molding, injection molding, or the like, are softer than the body portions, and are elastically deformable. For example, thermoplastic elastomers, resin, rubber, or the like can be used, and specifically, an olefin-based thermoplastic elastomer (TPO), a styrene-based elastomer (TPS), polyvinyl chloride resin (PVC), polypropylene resin (PP), an ethylene propylene diene copolymer (EPDM), and the like are included as the materials.

Further, as the materials that form the respective sealing portions 16, 16a, 160, and 160a, materials of which the durometer hardness (Type A) according to JISK7215 is HDA 50 to 80 are preferably used. In the present embodiment, the sealing portions are formed of a TPO material of HDA 70.

Here, portions which abut against the flange portions 18 and 180 and the interior material, such as the retaining lips 20, 200, and 200a and the cover lips 21 and 210 of the body portions 15 and 150, are also formed of the same materials as the sealing portions 16, 16a, 160, and 160a.

Moreover, core members made of metal or hard resin may be buried in the body portions 15 and 150 of the respective belt moldings in order to secure retaining forces when the belt molding is attached to the flange portions 18 and 180. In this case, the body portions can be formed by covering the surroundings of the core members with elastically deformable materials that have the same level of hardness as the sealing portions.

As for the respective belt moldings, first, the body portions 15 and 150 and the sealing portions 16, 16a 160, and 160a are integrally molded through co-press molding, and the fiber layers of the abutment portions are molded simultaneously with extrusion molding or after extrusion molding. Then, processing for attaching the belt molding 2 to the vehicle door 1, such as press processing of terminals or mounting of accessories such as clips, is performed.

Additionally, the respective sealing portions of each of the outer belt molding 10 and the inner belt molding 100 are at least two and are arranged substantially in parallel in the upper-lower direction along the body portion. Also, the upper sealing portions 16 and 160 are provided with the abutment portions 24 and 240 and the fiber layers 25 and 250 that abut against the window pane 5. Also, the lower sealing portions 16a and 160a are provided with the abutment portions 24a and 240a and the fiber layers 25a and 250a that abut against the window pane 5.

These fiber layers can be formed by an arbitrary method, such as electrostatic flocking, spraying of fibers, or sticking of a strip sheet material in which fibers are erected from a base material in advance.

Additionally, a plurality of these methods can be used. For example, a sheet material in which fibers are erected can be stuck on the upper sealing portions 16 and 160 so as to form the fiber layers 25 and 250, and the fiber layers 25a and 250a can also be formed on the lower sealing portions 16a and 160a by electrostatic flocking.

Moreover, the fiber layers are typically formed by performing bonding in a state where an adhesive is applied on a molded product or a base material of a sheet material, and fibers are erected on the molded product or the base material by charging of static electricity, or the like. Fibers that are upright with respect to the surface of a body to be bonded are present and fibers that are adhered obliquely with respect to the surface are also present.

Here, generally, the fiber layers of the sheet material have less dispersion and are more uniform, are more densely erected, and have a higher density than the fiber layers directly formed on a molded product by the so-called electrostatic flocking.

Additionally, when the sheet material in which fibers are erected is bonded on an extrusion-molded product simultaneously with the extrusion molding of the body portion, it is preferable to use the sheet material having a base material formed of a material of the same kind as or a material having an excellent miscibility with the molded product because the sheet material can be easily adhered to the molded product. For example, when a molded product is formed of TPO, if a sheet material formed of olefin-based resin is used as the base material, the sheet material can be thermally welded to the molded product by the heat generated when the molded product is molded. Additionally, a sheet material and a molded product can also be bonded by applying an adhesive, and thermal welding and application of an adhesive can also be used together.

Here, the length of the fibers that form the fiber layers is 0.3 mm or greater and 1.0 mm or smaller, and preferably 0.5 mm and 0.8 mm are used.

If the length of the fibers is shorter than 0.3 mm, the fibers are easily buried in an adhesive layer. As a result, when the abutment portions come into contact with the window pane, there is a fear that the fiber layers may not come into contact with the window pane but the adhesive layer may come into contact with the window pane, and abnormal noise may be generated when the window pane is moved up and down. Additionally, if the length of the fibers is greater than 1.0 mm, there is a fear that the distance between the fiber layers and the window pane may become too long and sound insulating properties may deteriorate.

Additionally, the thickness of the fiber is 1.0 decitex (also referred to as dtex) or greater and 4.5 decitex or smaller, and preferably 1.7 decitex and 3.3 decitex are used.

If the fibers are thinner than 1.0 decitex, there is a fear that the durability particularly when the fibers are used for a long period of time is not enough. Additionally, if the fibers are thicker than 4.5 decitex, there is a fear that the area of contact with the window pane may become too large, and sliding resistance may be increased or the rubbing noise with the window pane may be generated.

Here, as the materials of the fibers, other than nylon-based resin and polyester-based resin, polypropylene-based resin, acrylic resin, aramid-based resin, fluorine-based resin, and the like can also be used.

Here, the "decitex" is a unit based on JISL0101 and L0104, means weight per unit length, and is generally used as a unit that indirectly expresses the thickness of the fibers. Further, the fiber layers 25, 25a, 250, and 250a in FIG. 2 are schematically emphasized and illustrated than they actually are, and the thickness of actual fiber layers does not necessarily coincide with that illustrated in FIG. 2.

In the present embodiment, in the upper sealing portion 16 of the outer belt molding 10, for example, fibers, which are made of nylon-based resin, are 0.8 mm in length, and are 3.3 decitex in thickness, form the fiber layer 25. Further, in the lower sealing portion 16a, for example, fibers, which are made of the polyester-based resin, are 0.5 mm in length, and are 1.7 decitex in thickness, form the fiber layer 25a.

Additionally, in the upper sealing portion 160 of the inner belt molding 100, for example, fibers, which are made of nylon-based resin, are 0.8 mm in length, and are 3.3 decitex in thickness, form the fiber layer 250. Further, in the lower sealing portion 160a, for example, fibers, which are made of the polyester-based resin, are 0.5 mm in length, and are 1.7 decitex in thickness, form the fiber layer 250a.

In the respective belt moldings 10 and 100, the fiber layers 25 and 250 of the upper sealing portions 16 and 160 are made of the fibers longer than the fibers that form the fiber layers 25a and 250a of the lower sealing portions 16a and 160a. For this reason, foreign matter is easily taken into the roots of the fiber layers and entering of the foreign matter is easily prevented. Additionally, since the fiber layers 25 and 250 play the role of a cushion even when foreign matter enters between the window pane 5 and the abutment portions 24 and 240, the foreign matter is not strongly pressed against the window pane 5, and damage to the window pane 5 particularly in the outer belt molding 10 can be suppressed.

Additionally, when the fiber length and the fiber thickness are the same, since the fibers made of the nylon-based resin are more easily deformed than the fibers made of the polyester-based resin, the effect of suppressing the damage to the window pane 5 is relatively high, which is preferable.

Additionally, in the inner belt molding 100 of the present embodiment, the fiber layer 250a of the lower sealing portion 160a are made of the fibers shorter than the fibers that form the fiber layer 250 of the upper sealing portion 160. For this reason, the distance between the abutment portion 240a and the window pane 5 is short, and the sound insulating properties are excellent. When the short fibers are formed on the sealing portion in the inner belt molding 100 particularly as in the present embodiment, there is an effect that the noise, which is going to pass through the inside of the door to propagate within the vehicle, can be shielded.

Additionally, when the fiber layers 25a and 250a of the lower sealing portions 16a and 160a are made of the short fibers in the respective belt moldings 10 and 100, the amount of waterdrops that enter between the window pane 5 and the sealing portions and accumulate is small. Therefore, there is an advantage that, even if the waterdrops adhere to the window pane, the waterdrops easily gets dry, and sticking of the sealing portions 16a and 160a caused by freezing during a cold time can also be prevented.

Here, when the fiber layer 250 of the upper sealing portion 160 of the inner belt molding 100 is formed of the short fibers similar to the fiber layer 250a of the lower sealing portion 160a, this is more preferable from the viewpoint of an improvement in sound insulating properties or sticking prevention.

Moreover, since the waterdrops more easily get dry in the fiber layers formed of the fibers made of the polyester-based resin than the fibers made of the nylon-based resin when the fiber lengths are the same, sticking of the sealing portions onto the window pane can be easily prevented, which is preferable.

Additionally, in the respective belt moldings 10 and 100, the fiber layers 25a and 250a of the lower sealing portions 16a and 160a are formed of the fibers of the polyester-based resin. When the fiber layers are formed of the fibers of the polyester-based resin, even when the window pane 5 moves up and down in a state where waterdrops have adhered to the abutment portions 24a and 240a, sliding noise is not easily generated. Additionally, since sliding abnormal noise is not easily generated if the fiber layers are formed of the fibers of the polyester-based resin, the fiber layers can be strongly made to abut against the window pane 5, and waterdrops, dust, or the like adhering to the window pane 5 can be excellently wiped off.

Here, the sliding abnormal noise means a sound that is generated as the sealing portions of the belt molding and the surfaces of the window pane are rubbed against each other when the window pane 5 is closed or when the window pane begins to open. When the window pane and the sealing portions strongly contact each other or when waterdrops have adhered between the window pane and the sealing portions, the sliding abnormal noise is easily generated.

For this reason, from the viewpoint of preventing the abnormal noise when waterdrops have adhered, the fiber layer 25 of the upper sealing portion 16 of the outer belt molding 10 and the fiber layer 250 of the upper sealing portion 160 of the inner belt molding 100 may be formed of the fibers made of the polyester-based resin in which the waterdrops easily get dry.

Further, from the viewpoint of suppressing damage to the window pane, the fiber layer 25a of the lower sealing portion 16a of the outer belt molding 10 and the fiber layer 250a of the lower sealing portion 160a of the inner belt molding 100 may be formed of the fibers made of the nylon-based resin that is easily deformed.

Moreover, as the density per unit area of the fibers that form the fiber layers is higher, the sound insulating properties or the properties of wiping-off the waterdrops adhering to the window pane surface are excellent.

Although the embodiment related to the invention has been described above, the invention is not limited thereto and can be appropriately modified without departing from the spirit of the invention.

For example, the fiber layer 25 of the upper sealing portion 16 and the fiber layer 25 of the lower sealing portion 16a in the above embodiment may be set so as to be inverted upside down or inverted vehicle inside out. For example, in the inner belt molding 100, a fiber layer made of fibers that are made short and thin (for example, 0.5 mm, 1.7 decitex) may be formed on the upper sealing portion 160, and a fiber layer that is made long and thick (0.8 mm, 3.3 decitex) may be formed on the lower sealing portion 160a. Further, fiber layers respectively made of the same fiber (for example, 0.5 mm, 1.7 decitex, polyester-based resin) may be formed on the upper sealing portion 160 and the lower sealing portion 160a of the inner belt molding 100.

Additionally, the upper sealing portion 16 and the lower sealing portion 16a of the outer belt molding 10, and the upper sealing portion 160 and the lower sealing portion 160a of the inner belt molding 100 may have the fiber layers 25, 25a, 250, and 250a respectively made of different fibers. Moreover, three or more sealing portions may be formed on one belt molding, or two or more fiber layers may be formed on one sealing portion.

The fiber layers of any abutment portions may be respectively formed of fibers having the same length and different thicknesses, fibers having the same thickness and different lengths, or fibers having the same length and the same thickness but different materials. Additionally, the shape of the sealing portions 16 and 160 is not limited to the lip shape. For example, the shape of the sealing portions may be a ridge having a substantially semicircular cross-section.

The invention is not limited to the sealing portions 16 and 160 of the belt molding 2 that is mounted along the lower side of the opening of the vehicle door 1. For example, the invention can be applied to and carried out in arbitrary portions, such as stabilizers, which slide on the window pane integrally or separately from the belt moldings.

Additionally, in the above embodiment, the body portion and the sealing portions are integrally molded by co-extrusion molding. However, the invention is not necessarily limited to this process of manufacture. For example, while the body portion is formed in a predetermined shape by injection molding, the fiber layers are formed on the abutment portions of the sealing portions simultaneously when or after the sealing portions are formed by extrusion molding. Then, the sealing portions may be cut in a predetermined length, and may be adhered to the body portion by heat caulking, welding, bonding, or the like.

The present application is based on Japanese Patent Application No. 2012-234180 filed on Oct. 4, 2012, the content of which is incorporated herein by reference.

REFERENCE SIGNS LIST

1: VEHICLE DOOR
3: WINDOW OPENING
4: DOOR PANEL
5: WINDOW PANE
10: OUTER BELT MOLDING
11: OUTER DOOR PANEL
12: EXTERIOR LATERAL WALL PORTION
13: INTERIOR LATERAL WALL PORTION
14: CONNECTING PORTION
15: BODY PORTION
16, 16a: SEALING PORTION
17: REINFORCEMENT
18: FLANGE PORTION
19: ENGAGING PORTION
20: RETAINING LIP
21: COVER LIP
22, 22a: SEAL BODY PORTION
23, 23a: SEAL ROOT PORTION
24, 24a: ABUTMENT PORTION
25, 25a: FIBER LAYER
100: INNER BELT MOLDING
110: INNER DOOR PANEL
120: EXTERIOR LATERAL WALL PORTION
130: INTERIOR LATERAL WALL PORTION
140: CONNECTING PORTION
150: BODY PORTION
160, 160a: SEALING PORTION
180: FLANGE PORTION
190: ENGAGING PORTION
200: RETAINING LIP
210: COVER LIP
220, 220a: SEAL BODY PORTION
230, 230a: SEAL ROOT PORTION
240, 240a: ABUTMENT PORTION
250, 250a: FIBER LAYER

The invention claimed is:
1. A belt molding attached to a vehicle door and abutting against a window pane that is arranged in a window opening of a door body and can be moved up and down, the belt molding comprising:
   an elongated body portion attached along a flange of the window opening; and
   two elongated sealing portions (i) integrally formed with the elongated body portion, (ii) protruding from upper and lower parts of a lateral wall portion of the elongated body portion that faces the window pane, (iii) each attached to the lateral wall portion by way of a seal root portion that is thinner than the corresponding sealing portion, and (iv) each having one of two elongated abutment portions that are formed by an elastically deformable material along a longitudinal direction of the body portion and that abut against the window pane, wherein:
   fibers are secured to the abutment portion of each of the sealing portions, each of the abutment portions having secured thereto only one type of the fibers, a base material is adhered to each of the abutment portions so that an entire surface of the base material is adhered to the sealing portion that has the least one abutment portion, the fibers of each of the abutment portions being erected from a surface of the base material; and
the fibers of one of the abutment portions are thinner than the fibers of another of the abutment portions.

2. The belt molding according to claim 1, wherein:
the fibers of one of the abutment portions are shorter than the fibers of another of the abutment portions.

3. The belt molding according to claim 2, wherein:
the fibers of the abutment portion of the sealing portion arranged on the upper part of the lateral wall portion are longer than the fibers of the abutment portion of the sealing portion arranged on the lower part of the lateral wall portion.

4. The belt molding according to claim 1, wherein:
the length of the fibers of at least one of the abutment portions is 0.3 mm or greater and 1.0 mm or smaller.

5. The belt molding according to claim 1, wherein:
the fibers of the abutment portion of the sealing portion arranged on the lower part of the lateral wall portion are thinner than the fibers of the abutment portion of the sealing portion arranged on the upper part of the lateral wall portion.

6. The belt molding according to claim 1, wherein:
the thickness of the fibers of at least one of the abutment portions is 1.0 decitex or greater and 4.5 decitex or smaller.

7. The belt molding according to claim 1, wherein:
the fibers of at least one of the abutment portions are made of nylon-based resin.

8. The belt molding according to claim 7, wherein:
the fibers of the abutment portion of the sealing portion arranged on the upper part of the lateral wall portion are made of polyester-based resin, and the fibers of the abutment portion of the sealing portion arranged on the lower part of the lateral wall portion are made of nylon-based resin.

9. The belt molding according to claim 1, wherein:
the fibers of at least one of the abutment portions are made of polyester-based resin.

10. The belt molding according to claim 1, wherein:
the belt molding is an inner belt molding attached to an interior side of the vehicle door.

11. The belt molding according to claim 1, wherein:
the belt molding is an outer belt molding attached to an exterior side of the vehicle door.

12. The belt molding according to claim 1, wherein:
the fibers of at least one of the abutment portions are shorter than a thickness of the corresponding sealing portion.

13. A belt molding attached to a vehicle door and abutting against a window pane that is arranged in a window opening of a door body and can be moved up and down, the belt molding comprising:
an elongated body portion attached along a flange of the window opening; and
two sealing portions (i) integrally formed with the elongated body portion, (ii) protruding from upper and lower parts of a lateral wall portion of the elongated body portion that faces the window pane, (iii) one being a lip and the other being a ridge with a substantially semicircular cross-section, and (iv) each having one of two abutment portions that are formed by an elastically deformable material along a longitudinal direction of the body portion and that abut against the window pane, wherein:
fibers are secured to the abutment portion of each of the sealing portions, each of the abutment portions having secured thereto only one type of the fibers,
a base material is adhered to each of the abutment portions so that an entire surface of the base material is adhered to the sealing portion that has the abutment portion, the fibers of each of the abutment portions being erected from a surface of the base material; and
the fibers of one of the abutment portions are thinner than the fibers of another of the abutment portions.

* * * * *